United States Patent [19]
Adams et al.

[11] Patent Number: 5,991,976
[45] Date of Patent: Nov. 30, 1999

[54] ASSIST HANDLE MOUNTING PLATE

[75] Inventors: Todd C. Adams, Hudsonville; Thomas M. Kelley, Holland, both of Mich.

[73] Assignee: Prince Corporation, Holland, Mich.

[21] Appl. No.: 08/985,607

[22] Filed: Dec. 5, 1997

[51] Int. Cl.⁶ .................................................. B60N 3/02
[52] U.S. Cl. ..................... 16/444; 16/110.1; 16/DIG. 24; 411/85
[58] Field of Search ................................. 16/110 R, 112, 16/125, DIG. 24, DIG. 40, 110.1, 444; 296/71, 97.1, 214; 411/84, 85 R, 104; 190/115; 24/290–295

[56] References Cited

U.S. PATENT DOCUMENTS

| | | | |
|---|---|---|---|
| 2,105,580 | 1/1938 | Bechik . | |
| 2,249,923 | 7/1941 | Whitcombe | 411/85 |
| 2,341,829 | 2/1944 | Tinnerman | 411/84 |
| 3,205,546 | 9/1965 | Nelson | 24/292 |
| 4,686,609 | 8/1987 | Dykstra et al. | 362/61 |
| 4,828,910 | 5/1989 | Haussling | 428/284 |
| 4,981,323 | 1/1991 | Dowd et al. | 296/214 |
| 5,440,783 | 8/1995 | Allardyce et al. | 16/110 R |
| 5,519,917 | 5/1996 | Cordonnier | 16/110 R |
| 5,625,921 | 5/1997 | Smith | 16/114 R |
| 5,632,061 | 5/1997 | Smith et al. | 16/110 R |
| 5,636,891 | 6/1997 | Van Order et al. | 411/85 |

Primary Examiner—Chuck Y. Mah
Assistant Examiner—Donald M. Gurley
Attorney, Agent, or Firm—Price, Heneveld, Cooper, DeWitt & Litton

[57] ABSTRACT

A backing member includes locking structure for locking a Z-axis clip in alignment with the aperture of the clip aligned with aperture in the backing member. In a preferred embodiment of the invention, the backing member includes a track with spaced inwardly projecting lips which overlie edges of the base of the fastening clip for holding the clip adjacent the backing member. In a preferred embodiment of the invention, the backing member further includes an interlocking tab which can be ramped to snap-lock into an alignment aperture associated with the fastener clip for locking the fastener to the backing member against sliding motion within the track.

31 Claims, 4 Drawing Sheets

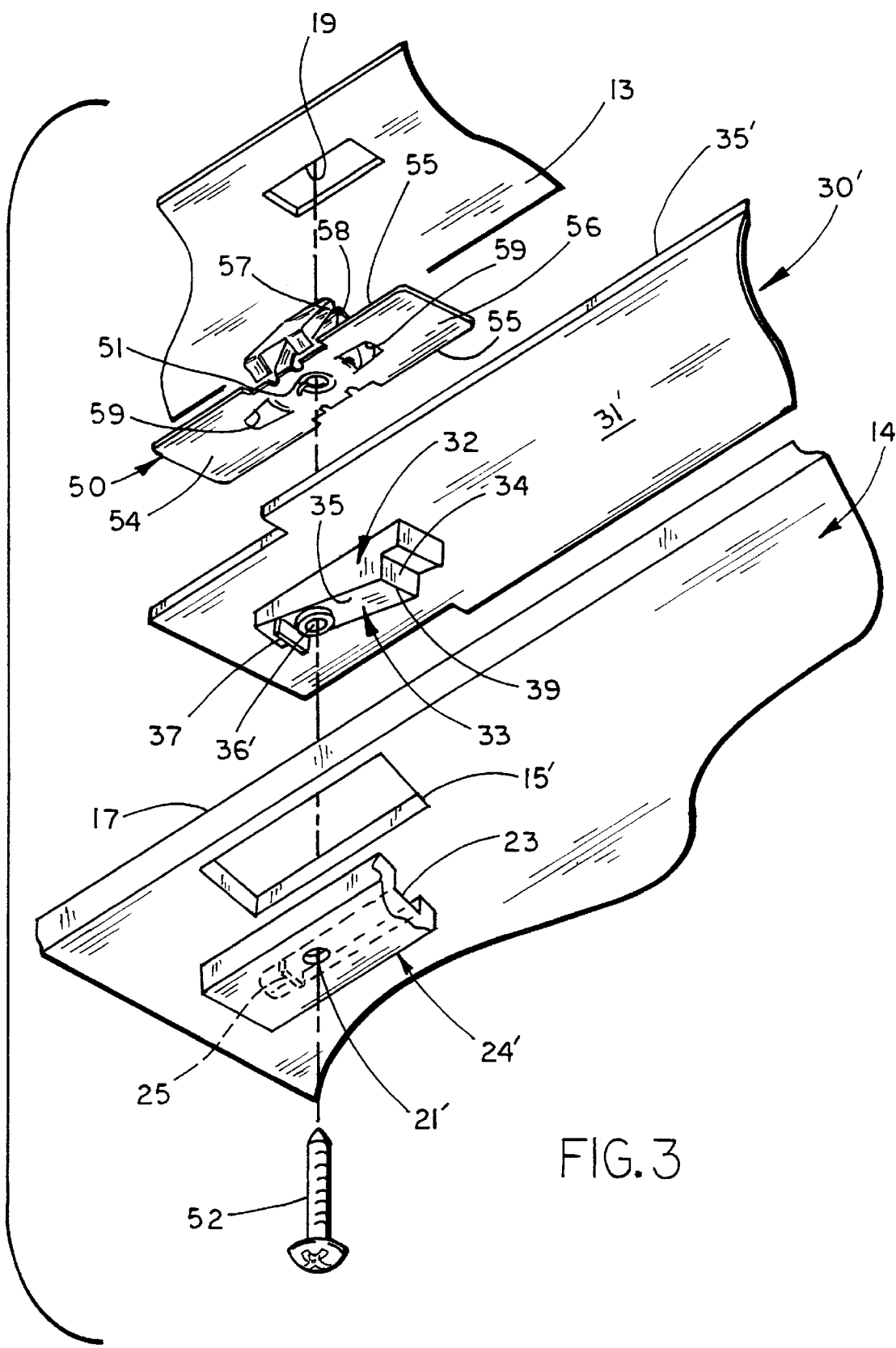

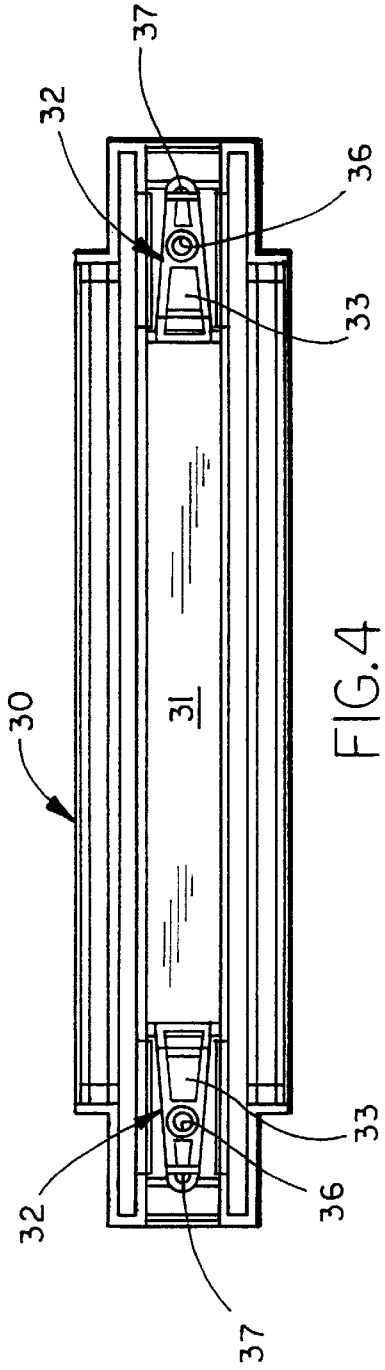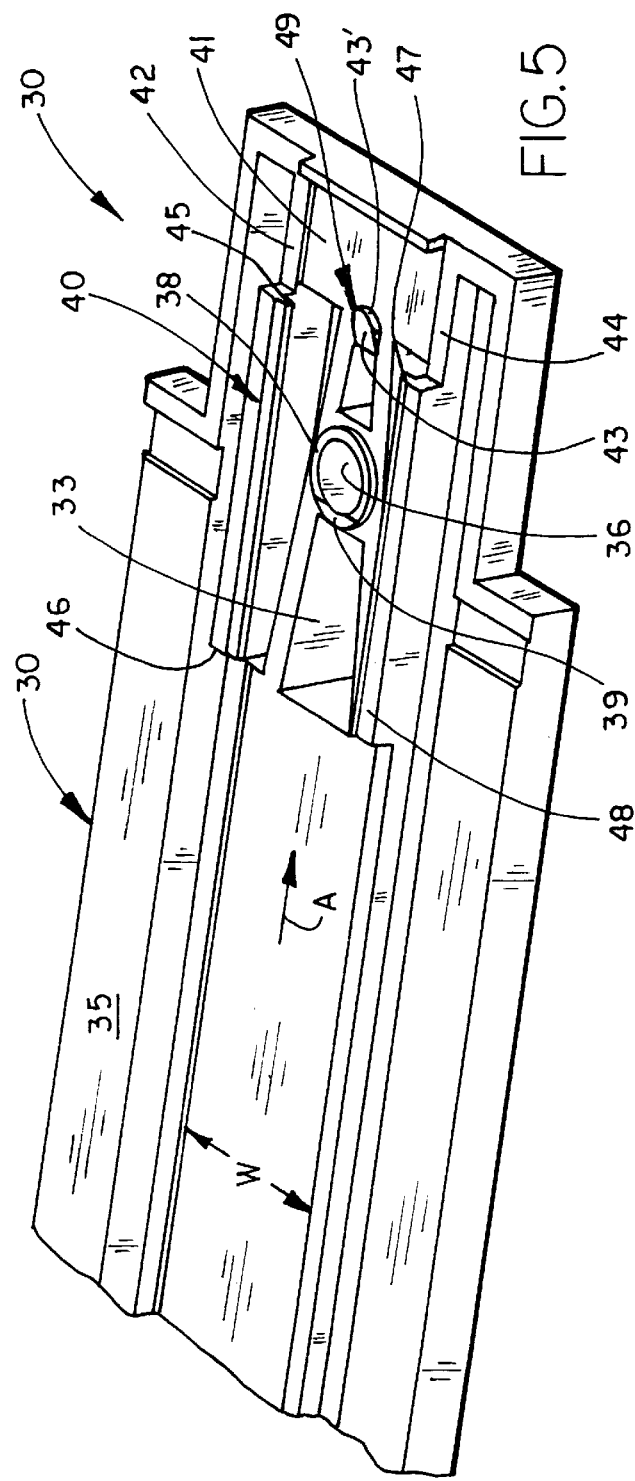

ASSIST HANDLE MOUNTING PLATE

BACKGROUND OF THE INVENTION

The present invention relates to assist handles and straps for vehicles and particularly to a mounting plate for attaching an assist handle or strap to a vehicle headliner and roof.

Assist straps or grab handles are in common use in vehicles and are typically mounted to the vehicle roof above a door for assistance in ingress and egress from the vehicle. Assist handles are also frequently mounted to vehicle doors for assistance in their closing. With the integration of vehicle accessories in premanufactured subassemblies of a vehicle, such as headliners and door panels, it has become desirable to mount the handles or straps to the vehicle headliner prior to installation of the headliner in the vehicle itself. In order to provide additional structural rigidity for the subassembly, frequently a backing plate is employed on the side of the headliner facing the vehicle roof and opposite that of the assist handle. The assist handle is then mounted to the vehicle headliner by a fastener extending through the backing member and into a Z-axis clip for subsequent snap-fitting into the vehicle and final tightening of the fastener. U.S. Pat. No. 5,440,783 discloses such a system, which allows preassembly of assist straps or handles to a vehicle headliner prior to final installation in the vehicle.

In such construction, the fastening clip is aligned with the backing member but is not captively held thereto until the fastener, such as a screw, extends through the assist strap, the headliner, the backing member and into the fastening clip. The clip, accordingly, must be properly aligned with respect to the backing member prior to installation in a mating aperture in the vehicle roof structure. Further, however, if it becomes necessary to remove an assist handle for repair, the fastening clip remains in the vehicle roof since it is snap-locked thereto. The backing member is then is not attached to the headliner or to the fastening clip and can float and misalign behind the vehicle headliner should the assist handle be removed, for example, to replace a bulb of a light assembly associated with the assist handle or for other repair of the assist strap or other accessory requiring removal of the headliner. The backing member, if misaligned, makes it impossible for the fastening screw to then be reinserted into the fastening clip since the backing member, typically a solid polymeric plate, obstructs the passage of the fastener into the fastening clip.

As a result, there exists a need for providing a backing assembly for preassembling an assist handle or strap to a vehicle headliner prior to final installation and one which aligns the Z-axis fastening clip with respect to the backing member and captively holds the backing member to the clip once installed such that if the assist handle is subsequently removed, the backing member remains aligned with and attached to the fastening clips with which it is associated.

SUMMARY OF THE PRESENT INVENTION

The system of the present invention accommodates this need by providing a backing member having a track for aligning a fastening clip therein and an end to the track having an aperture which aligns with the aperture in the mounting clip and which includes locking structure for locking the clip in alignment in the track with the aperture of the clip aligned with aperture in the backing plate. In a preferred embodiment of the invention, the track includes spaced inwardly projecting lips which overlie edges of the base of the fastening clip for holding the clip adjacent the backing member. In a preferred embodiment of the invention, the backing member further includes an interlocking tab which can be ramped to snap-lock into an alignment aperture associated with the fastener for locking the fastener to the backing member against sliding motion within the track. With such construction, therefore, fastening clips can be mounted to the backing member and snap-locked in alignment with apertures therein prior to the assembly of the assist handle to the headliner. Once installed in the vehicle, the backing member remains attached to the vehicle roof in alignment by means of the interlocked fastening clips such that upon removal of the assist handle, the backing member remains in place and in alignment such that the handle can be reinstalled. In a preferred embodiment also of the invention, the backing member includes projections extending on the side facing the interior of the vehicle for extending through apertures formed in the headliner and receiving an assist strap mounting member.

These and other features, objects and advantages of the present invention will best be understood by reference to the following description thereof together with reference to the accompanying drawings.

BRIEF DESCRIPTION OF THE DRAWINGS

FIG. 3 is an enlarged fragmentary exploded view of the mounting assembly for attaching an assist strap to the vehicle;

FIG. 4 is a bottom plan view of the backing member shown in fragmentary form in FIG. 3;

FIG. 5 is an enlarged fragmentary perspective view of the top right end of the mounting plate shown in FIG. 4.

DETAILED DESCRIPTION OF THE PREFERRED EMBODIMENTS

Figure 1:
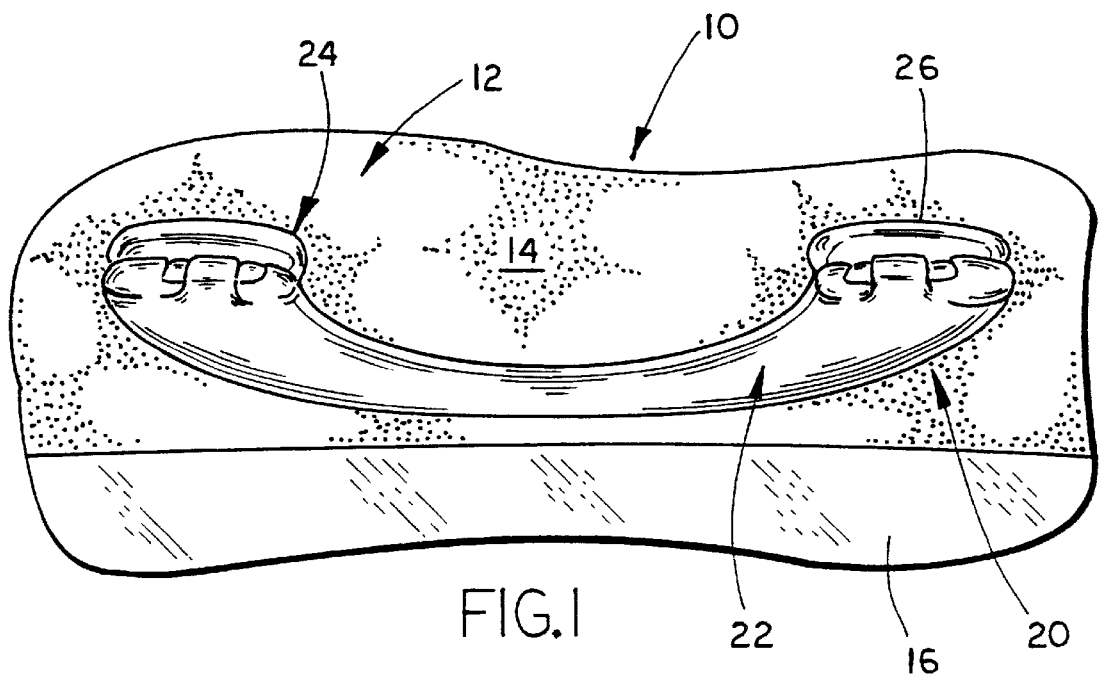
FIG. 1 is a fragmentary perspective view of a vehicle having an assist handle mounted to the vehicle utilizing the system of the present invention.

Referring initially to FIG. 1, there is shown a vehicle 10, such as an automobile, having a roof 12 with an underlying sheet metal support 13 (FIG. 2) covered by an integrally molded headliner 14. The section shown in FIG. 1 is above the right side rear passenger window 16 and shows a combined assist handle and hanger support assembly 20 which is mounted to the vehicle roof support 13 and headliner 14 by a backing member 30 (FIG. 2) embodying the present invention. The assist handle assembly 20 can be of the construction disclosed in greater detail in U.S. Pat. No. 5,625,921, the disclosure of which is incorporated herein by reference. The assembly includes a generally C-shaped handle 22 which is pivotally mounted by brackets 24 and 26 to the underlying sheet metal support 13 of the vehicle by means of the backing member 30 and a pair of fastening clips 50 at each end by the use of a fastener such as a screw 52. The assist or grab handle 22, as noted above, can be of the type described in the '921 patent or other rigid construction, or can take the form of a flexible assist strap with ends terminated by mounting brackets 24 and 26 to couple the strap to the vehicle roof utilizing the backing member 30' shown and described below in connection with FIGS. 3–5.

Figure 2:
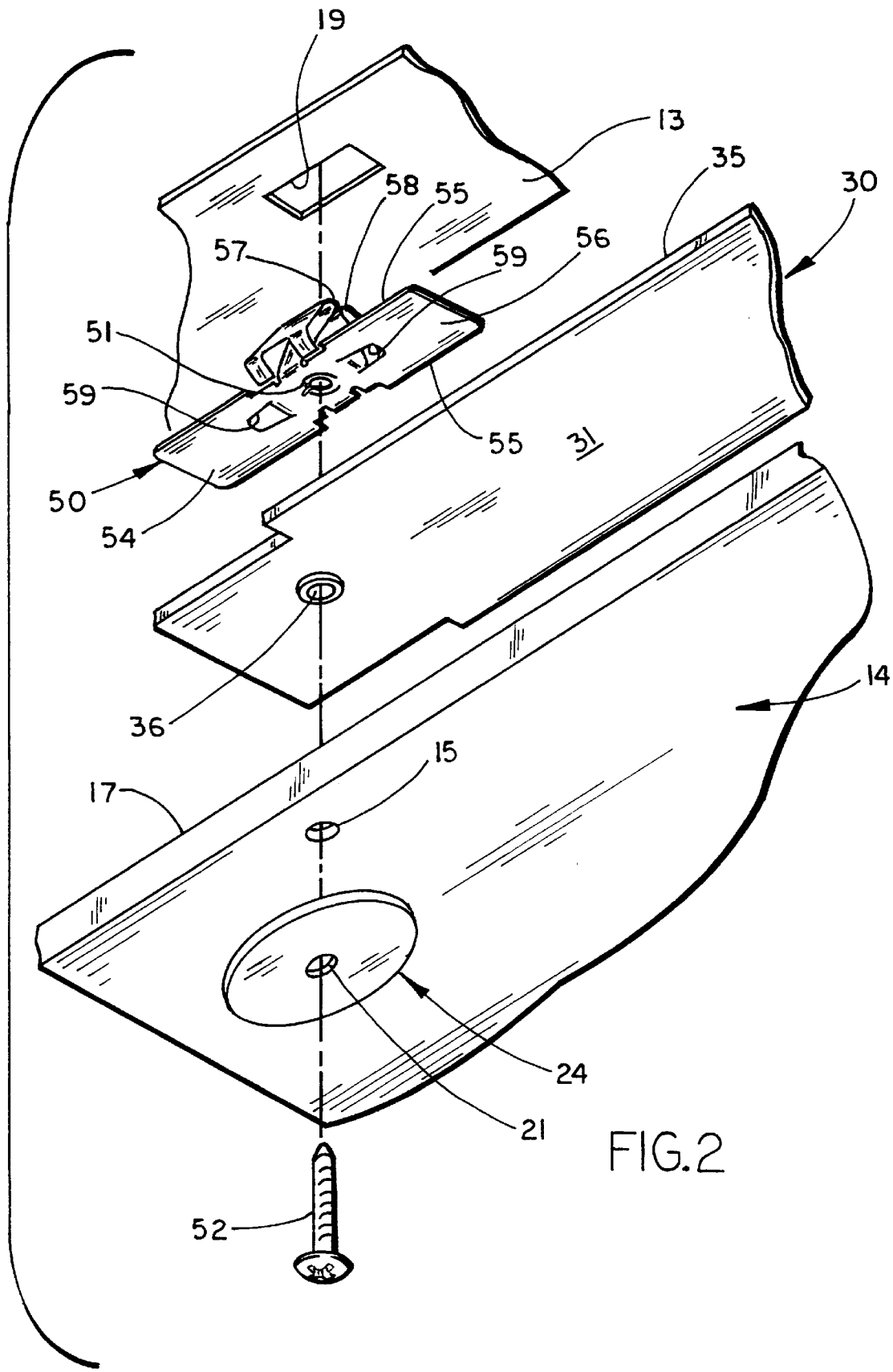
FIG. 2 is an enlarged fragmentary exploded view of the mounting assembly for attaching the assist handle to the vehicle.

Shown schematically in FIG. 2 is one of the brackets 24 of the assist handle assembly 20, which includes an aperture 21 through which fastener 52 extends. The aperture 21 in bracket 24 is aligned with an aperture 15 through headliner 14, which can be of an integrally molded fibrous batt-type construction such as disclosed in U.S. Pat. No. 4,828,910. Surface 31 of the backing member or plate 30 faces and engages the upper surface 17 of headliner 14 facing the sheet metal roof 13 of the vehicle with an aperture 36 at each end aligned with apertures 15 (one shown) of headliner 14.

Figure 6:
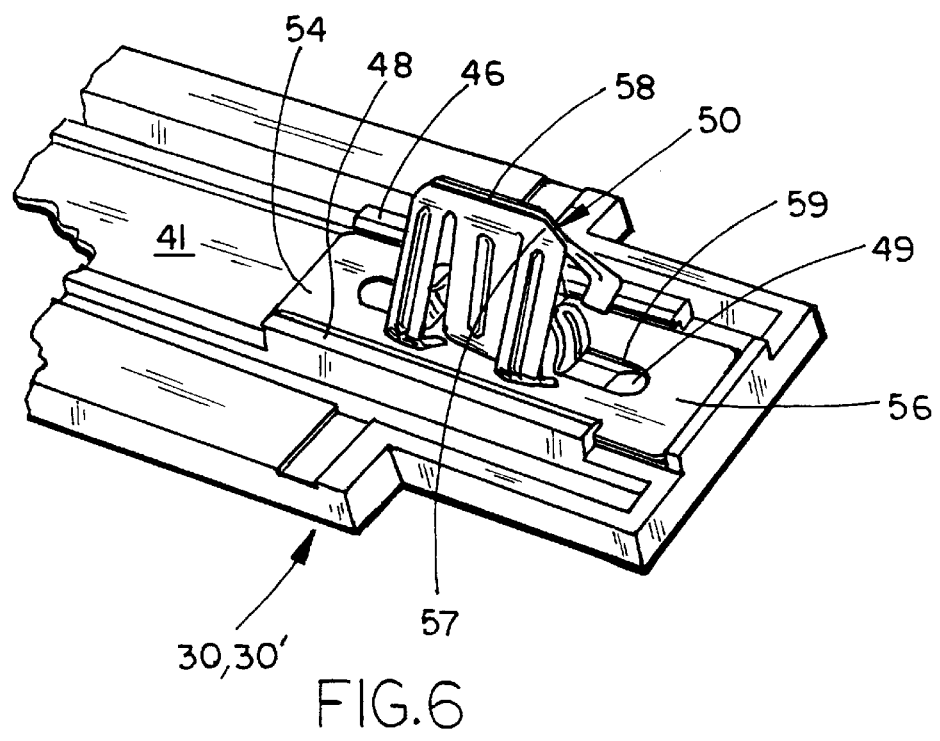
FIG. 6 is a top perspective view of an end of the backing members shown in FIGS. 2 and 3, shown with the fastening clip mounted thereto.

Fastening clip 50 includes a central opening 51 for receiving fastener 52 and includes a generally planar rectangular body having flat end flanges 54 and 56 with side edges 55, which are captively held by backing member 30 as described in greater detail below in connection with FIG. 6. The spring steel treated clip 50 includes a pair of upwardly projecting, spring-loaded fastening arms 57 and 58 which extend through the rectangular aperture 19 formed in the underlying sheet metal support 13 of the vehicle roof 12. Backing member 30 is integrally molded of a suitable polymeric material, such as polycarbonate, and on its upper surface 35 opposite lower surface 31 includes, as best seen in FIG. 5, the unique clip holding and alignment structure described below in connection with FIGS. 5 and 6. FIG. 3 shows an alternative embodiment of the backing member for use with an assist strap with ends which can slide with respect to the vehicle roof. In FIG. 3, end mounting bracket 24' for one end of the assist strap is shown schematically, it being understood that the same reference numerals on identical parts, as those in FIG. 2, are used in FIG. 3 and the symbol "'" is used for corresponding parts.

Shown schematically in FIG. 3 is one of the brackets 24' of an assist strap assembly which includes an aperture 21' through which fastener 52 extends. Bracket 24' also includes a recessed aperture 23 formed in the surface facing headliner 14 and aligned with a rectangular aperture 15' through headliner 14 which receives a raised mounting platform 32 extending from the lower surface 31' of backing member 30'. Surface 31' of the backing member 30' faces and engages the upper surface 17 of headliner 14 facing the sheet metal roof 13 of the vehicle with the raised, generally trapezoidal-shaped mounting platform 32 extending through aperture 15' and into recess 23 of mounting bracket 24'. Platform 32 is step-cut at 34 such that the lowermost section 33 extends into recess 23 with the lower section closest to surface 31' corresponding substantially to the thickness of the headliner 14. Mounting platform 32 includes a central aperture 36' aligned with aperture 21' in mounting bracket 24' for receiving fastener 52 therethrough which extends entirely through member 30' into an aperture 51 in fastener clip 50.

The surface 35 of the mounting platform 32 is tapered, as best seen in FIG. 3, and includes a downwardly extending shoulder 37, which aligns with the top corner 39 of mounting platform 32 and engages slot 25 in the mounting bracket 24'. The mounting platform interacts with the mounting bracket 24' to allow the terminal end of the assist strap (not shown) to slide with respect to the vehicle during use in a manner described in greater detail in U.S. Pat. No. 5,440,783, the disclosure of which is incorporated herein by reference.

Each of the backing members 30, 30' have identical fastener clip holding structure 40 (FIGS. 5 and 6) at each end on the side of the backing member facing roof 13. The fastener clip holding members 40, in the preferred embodiment of the invention, comprise a pair of spaced, parallel rails 42 and 44 which extend substantially the length of members 30, 30' and are spaced apart a distance W corresponding to the width of the fastener 50 to define a central recess 41 into which the clip can fit, as seen in FIG. 6. Member 40 further includes a pair of raised rails 46 and 48 each including inwardly projecting facing lips 45, 47, respectively, which engage the opposite edges 55 of the clip base for holding the clip adjacent to floor 41 of the backing member. The fastener clips, as best seen in FIGS. 2 and 3, include apertures 59 on either side of central fastener receiving aperture 51 which apertures are formed by upwardly extending legs bent from the apertures 59 and forming a part of the leg assemblies for the fastener clip. Apertures 59 are employed in connection with a locking tab 49 having an upwardly inclined surface 43 which allows the fastener clip 50 to be slid in a direction indicated by arrow A in FIG. 5 under lips 45 and 47 of rails 46 and 48, respectively, and cam over the locking tab 49 until the edge 43' of locking tab 49 engages the edge of aperture 59. This snap-locks the fastener clip in longitudinal alignment within the recess 41 with its aperture 51 aligned with aperture 36 extending through the backing member 30, as shown in FIG. 6. The lips 45, 47 are spaced above floor 41 a distance sufficient to allow the base of fastener clip 50 to slide thereunder and locking tab 49 is sufficiently high to snap-lock to aperture 59 of clip 50 when inserted within the clip locking member 40, as seen in FIG. 6.

For assembly and mounting of the assist handle or assist strap 20, a pair of fastener clips 50 are each mounted to fastener members 40 on side 35 of backing member 30 or 30' and the backing member positioned with apertures 36, 36' aligned with apertures 15, 15' in the headliner 14. The mounting brackets 24, 24' and 26 for the assist handle or strap 22 are then aligned with the apertures and fastener 52 threadably fitted into aperture 51 of fastener clip 50 through aperture 21, 21' in mounting brackets 24, 24' and apertures 36, 36' in the backing member 30, 30'. This operation attaches the assist handle or strap to the headliner. Fastener 52 typically will be covered by a suitable cover cap, bezel or the like in a conventional manner. The headliner once installed utilizing, in part, fastening clips 50 associated with the assist handle or strap is then installed by urging the legs 57, 58 of the fastening clip 50 through aligned apertures 19 in the underlying sheet metal support 13 of the vehicle roof.

In the event the assist handle assembly includes a continuous bezel with mounting brackets 24, 26 at opposite ends, it may also include a light assembly of the type disclosed in U.S. Pat. No. 4,686,609, which may from time to time require replacement of the light bulb. Alternately, the assist handle or strap itself may require replacement or repair. In such case, fasteners 52 can be removed from clips 50 which allows the assist handle or strap 22 to be removed from the headliner 14 while the backing member 30 and captively held clips 50 remain attached to the sheet metal roof 13 by virtue of the clip holding members 40 at opposite ends of the backing member 30. Thus, the backing member will remain in alignment in relation to the roof and be readily accessible for reattachment of the assist handle or strap once the repair has been made. Although in the preferred embodiment, rails 42 and 44 are extended the length of backing member 30, 30' such that the clips 50 can be easily positioned between the rails and then slid under lips 45, 47. In other embodiments, the rails 46, 48 alone provide sufficient guidance and support for the clips 50. In order to assist the clip in sliding within the captive tracks 46, 48, the inner edge of collar 38 surrounding aperture 36 may be beveled at 39 (FIG. 5) to assist in the mounting of a clip 50 to a clip holding member 40.

Thus, with the system of the present invention, an improved backing member is provided which remains aligned with fastening clips associated with a vehicle accessory such as an assist handle or strap, although the structure can be used in connection with the mounting of other vehicle accessories, such as visors or the like, which may use Z-axis fastening clips 50 and utilize backing members for preassembly to a vehicle headliner assembly prior to positioning and mounting the headliner to a vehicle. It will become apparent to those skilled in the art that the above-noted modifications will occur to those skilled in the art but will not depart from the spirit or scope of the present invention as defined by the appended claims.

The invention claimed is:

1. A mounting system for attaching a vehicle accessory to a vehicle panel comprising:
   a vehicle accessory having an aperture formed therethrough for receiving a fastener;
   a vehicle support panel having an aperture for receiving said fastener;
   a backing member positioned on said panel opposite said accessory and including an aperture formed therethrough for receiving said fastener, wherein said backing member includes a first surface facing said support panel and a second surface including a fastener clip holder, said fastener clip holder captively holding a fastener clip to said second surface of said backing member in alignment with said aperture through said backing member; and
   a fastener clip positioned in said clip holder of said backing member.

2. The mounting system as defined in claim 1 wherein said clip holder includes a pair of spaced parallel rails extending at least on opposite sides of said aperture of said backing member, said rails extending from said surface of said backing member.

3. The mounting system as defined in claim 2 wherein said rails are spaced to slidably receive said fastener clip.

4. The mounting system as defined in claim 3 wherein said rails include inwardly facing lips spaced from said surface of said backing member for overlying opposite edges of said fastener clip.

5. The mounting system as defined in claim 4 wherein said fastener clip includes a base engaging said surface of said backing member and an aperture extending through said base, said backing member further including a locking tab extending from said base between said rails for lockably engaging said aperture in said base of said fastener clip.

6. The mounting system as defined in claim 5 wherein said locking tab includes an inclined ramp allowing said fastener clip to slide over and snap-lock onto said locking tab.

7. The mounting system as defined in claim 6 wherein said backing member is integrally molded of a polymeric material.

8. The mounting system as defined in claim 7 wherein said backing member is elongated and includes a pair of apertures near opposite ends thereof and wherein said rails extend continuously between said apertures.

9. The mounting system as defined in claim 1 wherein a side of said backing member opposite said clip holder includes a mounting platform extending therefrom and surrounding said aperture in said backing member.

10. A backing member for attaching a vehicle accessory to a vehicle headliner in which a vehicle accessory includes an aperture formed therethrough for receiving a fastener; a vehicle support panel includes an aperture for receiving said fastener; a backing member is positioned on said support panel opposite said accessory and includes an aperture formed therethrough for receiving said fastener; and a fastener clip is positioned adjacent said backing member and includes an aperture for receiving said fastener, wherein the improvement comprises: said backing member including a fastener clip holder for captively holding said fastener clip to a surface of said backing member facing the support panel and in alignment with said aperture through said backing member.

11. The backing member as defined in claim 10 wherein said clip holder includes a pair of spaced parallel rails extending at least on opposite sides of said aperture of said backing member, said rails extending from said surface of said backing member.

12. The backing member as defined in claim 11 wherein said rails are spaced to slidably receive said fastener clip.

13. The backing member as defined in claim 12 wherein said rails include inwardly facing lips spaced from said surface of said backing member for overlying opposite edges of said fastener clip.

14. The backing member as defined in claim 13 wherein said fastener clip includes a base engaging said surface of said backing member and an aperture extending through said base, said backing member further including a locking tab extending from said surface between said rails for lockably engaging said aperture in said base of said fastener clip.

15. The backing member as defined in claim 14 wherein said locking tab includes an inclined ramp allowing said fastener clip to slide over and snap-lock onto said locking tab.

16. The backing member as defined in claim 15 wherein said backing member is integrally molded of a polymeric material.

17. The backing member as defined in claim 16 wherein said backing member is elongated and includes a pair of apertures near opposite ends thereof and wherein said rails extend continuously between said apertures.

18. The backing member as defined in claim 10 wherein a side of said backing member opposite said clip holder includes a mounting platform extending therefrom and surrounding said aperture in said backing member.

19. A mounting system for attaching a vehicle assist member to a vehicle headliner comprising:
   a vehicle assist member having mounting brackets at opposite ends, each bracket including an aperture formed therethrough for receiving a fastener;
   a vehicle support headliner having a pair of spaced apertures for receiving said fasteners;
   a backing member located on a side of said headliner opposite said assist member and including a fastener clip holder for captively holding a fastener clip to said backing member in alignment with each of said apertures through said backing member; and
   a fastener clip positioned in said clip holder of said backing member.

20. The mounting system as defined in claim 19 wherein each of said clip holders include a pair of spaced inwardly facing parallel lips overlying opposite edges of said fastener clip for holding said fastener clip to said backing member in alignment with said aperture in said backing member.

21. The mounting system as defined in claim 20 wherein each of said clip holders further include a locking tab engaging said fastener clip for lockably holding said fastener clip.

22. A backing member for attaching a vehicle assist strap or handle to a vehicle headliner comprising:
   an elongated generally rectangular body having first and second surfaces;

an aperture formed through said body near each end thereof for receiving a fastener therethrough;

a pair of parallel spaced inwardly projecting lips spanning each aperture at opposite ends of said body on said first surface for holding a fastener clip on said first surface for alignment with said apertures through said body; and a fastening clip captively held between said lips in fixed alignment with said apertures through said body, said fastening clip having spring legs for attaching said backing member to a vehicle support.

23. The backing member as defined in claim 22 and further including a locking tab extending from said first surface and positioned between said lips for lockably engaging a fastener clip.

24. The backing member as defined in claim 23 wherein said locking tab includes an inclined surface allowing a fastener clip to slide onto said locking tab.

25. The backing member as defined in claim 22 wherein said lips are formed on a pair of spaced rails extending substantially the length of said body.

26. The backing member as defined in claim 22 wherein said body includes a collar surrounding each of said apertures in said body, said collar including an inclined surface for snap-locking to an aperture in the fastener clip.

27. A backing member for attaching a vehicle accessory to a vehicle panel comprising:

a generally rectangular body having first and second surfaces;

an aperture formed through said body for receiving a fastener therethrough;

a pair of parallel spaced inwardly projecting lips spanning said aperture on said first surface for holding a fastener clip on said first surface for alignment with said aperture through said body; and a fastening clip captively held between said lips in fixed alignment with said aperture through said body, said fastening clip having spring legs for attaching said backing member to a vehicle support.

28. The backing member as defined in claim 27 and further including a locking tab extending from said first surface and positioned between said lips for lockably engaging a fastener clip.

29. The backing member as defined in claim 28 wherein said locking tab includes an inclined surface allowing a fastener clip to slide onto said locking tab.

30. The backing member as defined in claim 27 wherein said lips are formed on a pair of spaced rails extending substantially the length of said body.

31. A backing member for attaching a vehicle accessory to a vehicle panel comprising:

a generally rectangular body having first and second surfaces;

an aperture formed through said body for receiving a fastener therethrough;

a pair of parallel spaced inwardly projecting lips spanning said aperture on said first surface for holding a fastener clip on said first surface for alignment with said aperture through said body, wherein said body includes a collar surrounding each of said apertures in said body, said collar including an inclined surface for snap-locking to an aperture in the fastener clip.

* * * * *